US008918463B2

(12) United States Patent
Garcia et al.

(10) Patent No.: US 8,918,463 B2
(45) Date of Patent: Dec. 23, 2014

(54) AUTOMATED EVENT TAGGING

(75) Inventors: David Harry Garcia, Sunnyvale, CA (US); Robert Sean Goodlatte, San Francisco, CA (US); Samuel Odio, Portola Valley, CA (US)

(73) Assignee: Facebook, Inc., Menlo Park, CA (US)

( * ) Notice: Subject to any disclaimer, the term of this patent is extended or adjusted under 35 U.S.C. 154(b) by 16 days.

(21) Appl. No.: 13/097,915

(22) Filed: Apr. 29, 2011

(65) Prior Publication Data

US 2012/0278387 A1 Nov. 1, 2012

(51) Int. Cl.
*G06F 15/16* (2006.01)
*G06F 17/30* (2006.01)
*G06Q 50/00* (2012.01)
*G06Q 10/10* (2012.01)
*G06Q 30/02* (2012.01)

(52) U.S. Cl.
CPC .......... *G06Q 50/01* (2013.01); *G06F 17/30699* (2013.01); *G06Q 10/10* (2013.01); *G06Q 30/0277* (2013.01)
USPC ............................. 709/204; 370/260; 707/770

(58) Field of Classification Search
CPC .................. G06F 17/30699; G06F 17/30867; G06F 17/30766; G06Q 30/02; G06Q 10/10; G06Q 50/01; G02B 2027/014; G02B 2027/0178; G02B 27/017; H04L 29/06; H04L 29/08072
USPC ........................... 709/204; 370/260; 707/770; 715/733–759

See application file for complete search history.

(56) References Cited

U.S. PATENT DOCUMENTS

| 7,669,123 | B2 | 2/2010 | Zuckerberg | |
|---|---|---|---|---|
| 7,698,660 | B2 | 4/2010 | Sanchez | |
| 8,335,763 | B2 | 12/2012 | Narayanan | |
| 2006/0184617 | A1 | 8/2006 | Nicholas | |
| 2006/0230061 | A1 | 10/2006 | Sample | |
| 2006/0265418 | A1* | 11/2006 | Dolezal et al. | 707/102 |
| 2007/0198534 | A1 | 8/2007 | Hon | |
| 2007/0255785 | A1 | 11/2007 | Hayashi | |
| 2008/0040673 | A1 | 2/2008 | Zuckerberg | |
| 2008/0114844 | A1 | 5/2008 | Sannchez | |
| 2008/0126366 | A1* | 5/2008 | Malik et al. | 707/100 |
| 2008/0195657 | A1 | 8/2008 | Naaman | |
| 2008/0195741 | A1 | 8/2008 | Wynn | |
| 2009/0047972 | A1 | 2/2009 | Neeraj | |
| 2009/0157680 | A1* | 6/2009 | Crossley et al. | 707/6 |
| 2010/0029326 | A1 | 2/2010 | Bergstrom | |
| 2010/0057768 | A1 | 3/2010 | Chen | |

(Continued)

OTHER PUBLICATIONS

International Search Report and Written Opinion for International Application PCT/US2012/035475, Nov. 28, 2012.
U.S. Appl. No. 13/229,241, filed Sep. 9, 2011, Odio.
Office Action for U.S. Appl. No. 13/229,241, Apr. 22, 2013.

*Primary Examiner* — Eleni Shiferaw
*Assistant Examiner* — Gregory M Elmore
(74) *Attorney, Agent, or Firm* — Baker Botts L.L.P.

(57) ABSTRACT

One or more computing devices receive, from each of multiple users, a current location and an indication of one or more content objects for uploading; the computing devices identify a first event tag based on social and spatio-temporal proximity between a subset of the users; the computing devices present the first event tag to at least one of the subset of the users; in response to one or more users of the subset of the users, the computing devices also associate the first event tag to the content objects from each of the subset of the users.

17 Claims, 9 Drawing Sheets

(56) References Cited

U.S. PATENT DOCUMENTS

| | | | |
|---|---|---|---|
| 2010/0058196 A1* | 3/2010 | Krishnan et al. | 715/747 |
| 2010/0083124 A1 | 4/2010 | Druzgalski | |
| 2010/0094627 A1* | 4/2010 | Katpelly et al. | 704/235 |
| 2010/0114965 A1 | 5/2010 | Dean | |
| 2010/0130226 A1* | 5/2010 | Arrasvuori et al. | 455/456.1 |
| 2010/0153857 A1 | 6/2010 | Sanchez | |
| 2012/0106738 A1* | 5/2012 | Belenkiy et al. | 380/270 |
| 2012/0166452 A1* | 6/2012 | Tseng | 707/749 |

* cited by examiner

US 8,918,463 B2

AUTOMATED EVENT TAGGING

TECHNICAL FIELD

The present disclosure relates generally to a geo-social networking service that allows users to upload photos, and, more particularly, to methods of automatically determining an event and associating the event with photographs and other multimedia objects uploaded from multiple users based on social and spatio-temporal proximity data.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network system to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

SUMMARY

Particular embodiments relate to automatically identifying an event based on detected activity of a plurality of users and associating the event with photographs and other content uploaded from multiple users based on social and spatio-temporal proximity data. These and other features, aspects, and advantages of the disclosure are described in more detail below in the detailed description and in conjunction with the following figures.

DETAILED DESCRIPTION

Figure 1:
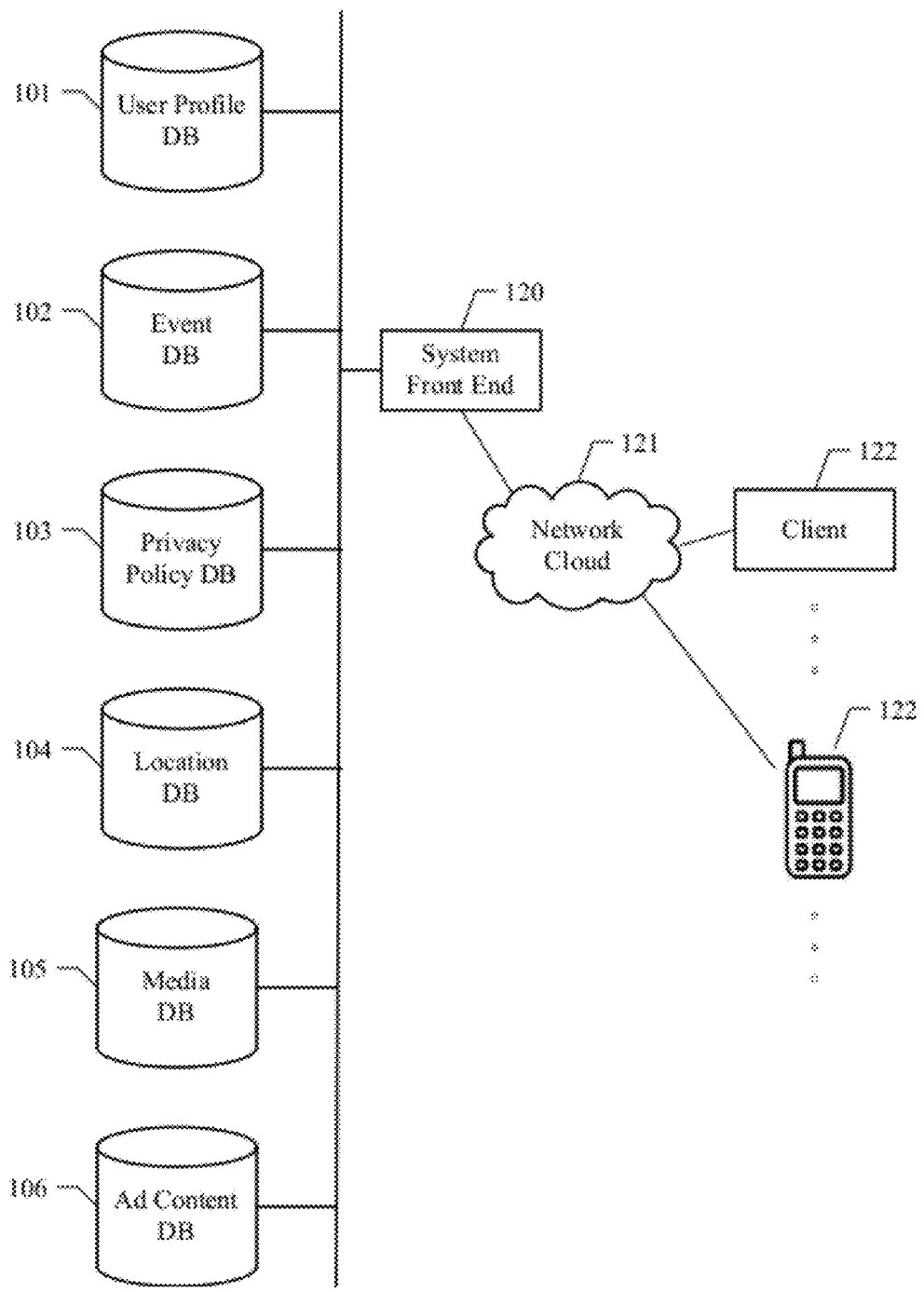
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The social networking system may automatically checks in a user to a place based on the user's current location and past location data, as described in U.S. patent application Ser. No. 13/042, 357 filed on Mar. 7, 2011, which is incorporated by reference herein for all purposes. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's path or that are frequented by the user. In one implementation, a user may opt in to this recommendation service, which causes the client application to periodically post location data of the user to the social networking system.

A social networking system may maintain a database of advertising content from advertisers, and generate and communicate advertisements to users of the social networking system. The social networking system may increase effectiveness of advertising by providing an advertisement that is targeted to a user who is likely to be interested in the advertisement. U.S. application Ser. No. 12/195,321, incorporated by reference in its entirety for all purposes, describes a system that selects advertisements by matching targeting criteria of advertisements and a user's profile information and past actions, and presents the selected advertisements to the user. The social networking system may also generate and communicate advertisements to a user based on the user's social graph information. For example, in additional to presenting an advertisement that is targeted to a particular user, the social networking system may communicate information about the advertisement to other users connected to the particular user. U.S. application Ser. No. 12/193,702 describes a system that selects advertisements for a targeted user by matching targeting criteria of advertisements and past actions of another user connected to the targeted user, and presented information about the matched action and the selected advertisements to the targeted user.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. For example, a user may register with an existing event by accessing a client application to confirming attending the event, and cause the confirmation to be stored in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, the social networking system may store advertising content and associated information in advertising content database 106. For example, advertising content can include advertising messages and media data (e.g., graphic arts, photos, video clips). For example, information associated with the advertising content can include information about advertisers (e.g., name, URL), business category (e.g., sporting goods, Japanese restaurant, retail clothing), one or more locations, and targeting criteria (e.g., a certain age group, a certain interest). In one implementation, an administrator of a hub node corresponding to a place maintained by the geo-social networking system may configure one or more advertisements, offers or coupons that may be presented to a user. In particular embodiments, databases 101, 102, 103, 104, 105, and 106 may be operably connected to the social networking system's front end. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., MICROSOFT WINDOWS INTERNET EXPLORER, MOZILLA FIREFOX, APPLE SAFARI, GOOGLE CHROME, and OPERA, etc.) or special-purpose client application (e.g., FACEBOOK for IPHONE, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device.

In particular embodiments, a user of the social networking system may upload one or more media files to media database 105. For example, a user can upload a photo or a set of photos (often called a photo album), or a video clip (or an audio clip) to media database 105 from a client device 122 (e.g., a computer, or a camera phone). In particular embodiments, the one or more media files may contain metadata (often called "tags") associated with each media file. For example, a photo shot by a digital camera may contain metadata relating to file size, resolution, time stamp, name of the camera maker, and/ or location (e.g., GPS) coordinates. A user can add additional metadata values to a photo, or tag a photo, during or in connection with an upload process. Some examples of tags of a media file are author, title, comments, event names, time, location, names of people appearing in the media file, or user comment. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. In particular embodiments, the social networking system may also extract metadata from a media file and store the metadata in media database 105. In one implementation, the client device 122 may implement the Exchangeable image file format (Exif), or a modified version thereof.

Ordinarily, as a user uploads photos using a media uploading tool from the user's mobile device (e.g., a mobile phone, netbook, smartphone, tablet, or other portable device) to a photo sharing website, the media uploading tool or the photo sharing website often tags or associates the photos to be uploaded with a default setting, for example, by aggregating photos to a photo album named "Mobile Uploads" or "Jun. 10, 2010", regardless of the event or location when the photos were taken. The user can rename the photo album later on to reflect an actual event or location, for example, "Sam's birthday party" or "Hiking in Sierra Nev.". Furthermore, the user may have to give other users a pointer to the photo album (e.g., an URL address) to enable other users to upload their photos for the same event from other user's respective computing devices to the photo album. Particular embodiments herein describe methods of automatically identifying an event and associating the event with photos and other content uploaded from multiple users.

Figure 2:
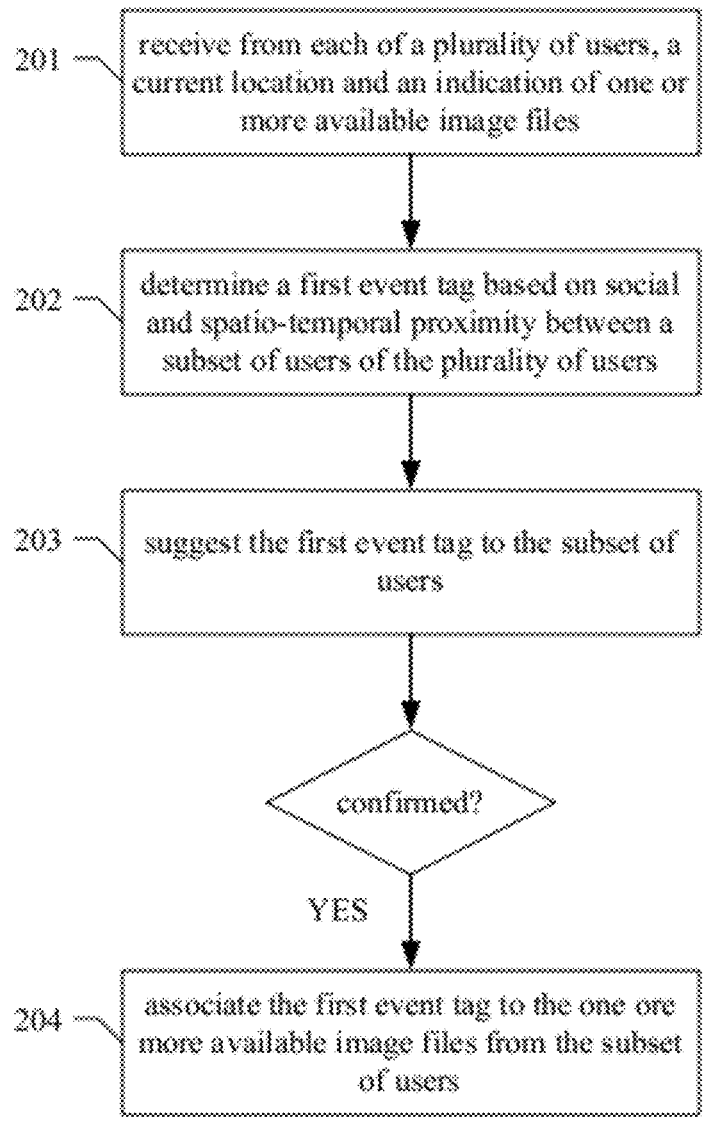
FIG. 2 illustrates an example method of automatically tagging an event to photos uploaded from multiple users.

FIG. 2 illustrates an example method of automatically associating an event with photos uploaded from multiple users and tagging the photos with tags representing the event. FIG. 2 can be implemented by an event tagging process hosted by one or more computing devices of the social networking system. The server-side user tagging process may operate in connection with a client-side photo tagging and/or media uploading application hosted on one or more client devices. In particular embodiments, the event tagging process may receive from each of a plurality of users a current location and an indication of one or more available image files from a photo tagging application hosted on a client device 122 (201). In particular embodiments, an image file may be a still photographic picture, a video clip, or a still frame of a video clip. For example, the event tagging process can receive from multiple people attending a Christmas party, individual requests to upload photos from each individual's mobile camera phone to the social networking system. A user may access a special-purpose client application, e.g., a media uploading tool, hosted by the user's GPS-equipped mobile phone and select one or more image files, causing the media uploading tool to transmit an uploading request comprising the user's identifier relative to the social networking system, the user's current location (e.g., GPS coordinates) with a time stamp, and identifiers for the one or more image files, to the social networking system. Additionally, if a user's location data is not available from the uploading request (e.g., no GPS signal received by the user's mobile phone at the time of the uploading request), the event tagging process may access location database 104 to retrieve the user's most recent location and associated time stamp, for example, the most recent check-in activity, or the most recent recorded GPS coordinates and associated time stamp from the user's GPS-equipped mobile phone. Other methods for identifying the location of the user may include data reports from POS terminals or mobile devices of other users that have interacted with the user's mobile phone via BlueTooth or Near-Field Communications protocols.

In particular embodiments, the event tagging process may detect an event and determine a first event tag based on social and spatio-temporal proximity between a subset of users (and their associated uploads) of the plurality of users (202). In particular embodiments, the event tagging process may identify a subset of users who are within a pre-determined social proximity among each other, and are within a pre-determined spatio-temporal proximity among each other. If there is a threshold number of upload requests within this group or their uploads of this group fit a profile that indicates an event is likely, the event tagging process may detect an event. For example, the event tagging process can access user profile database 101 based on the user identifiers, location data and time stamp data of the uploading requests, to identify a subset of users who are within one or two degrees of separation from each other, and are requesting to upload image files from locations within a quarter-mile radius, and within a sliding window of +/−30 minutes. The event tagging process may determine a common location by averaging GPS coordinates locations of the uploading requests from the subset of users, and determine a common time instance by averaging time stamp data of the uploading requests from the subset of users. In particular embodiments, the event tagging process may determine a first event tag based on a common location and a common time instance between the identified subset of users.

For example, the event tagging process can access location database 105 and based on the common location, identify a location or a place (e.g., a coffee shop, a ball park, a beach) near the common location, and create an event tag (e.g., "Wrigley Field, Jul. 4, 2010") based on the common location and the common time instance. For example, the event tagging process can access location database 104 to identify a location or a place based on the common location, access event database 102 based on the identified location or place and the common time instance, and create an event tag by identifying an event happening at or near the identified location and the common time instance (e.g., a rock concert, a charity event). The event tagging process may access event database 102 to determine whether other users have registered for or checked-in to an event near the user's location. This process step can be used to determine whether the user is at an existing event or whether a new event should be created and, if an existing event is found, the identity of the event and event metadata that can be used for additional event tag suggestions.

In some embodiments, the event tagging process may determine a first event tag based on one or more sponsorships. For example, the event tagging process can access advertisement content database 106 based on the common location, identify an advertiser with a location near the common location, and create an event tag associated with the advertiser. For example, if the common location is within 1 mile from Disney Land and the common time instance is Aug. 1, 2010, the event tagging process can create an event tag "Disney Land, Aug. 1, 2010."

In particular embodiments, the event tagging process may suggest the first event tag to the subset of users (203). For example, for each user of the subset of users, the event tagging process can transmit a message to the media-uploading tool hosted by the user's mobile phone, causing the media-uploading tool to present the first event tag to the user. In particular embodiments, if one or more users of the subset of users confirm the first event tag, the event tagging process may associate the first event tag to the one or more available image files from the subset of users (204). For example, for each user of the subset of users, the event tagging process can transmit a message to the media uploading tool hosted by the user's mobile phone, causing the media uploading tool to add the first event tag to metadata of the image files selected for the photo uploading request. In particular embodiments, the event tagging process may create and store an event based on the first event tag in event database 102. In some embodiments, the event tagging process may configure the event based on the first event tag to be unique to the subset of users, for example, the attendees of the event based on the first event tag can comprise of only the subset of users.

In particular embodiments, the event tagging process may store the tagged image files in a data store. For example, the event tagging process can store the tagged image files uploaded to the social networking system by the media-uploading tool in media database 105. Additionally, the event tagging process may create a photo album for the first event tag and associate the tagged image files with the photo album, i.e., upload the photos to the photo album. The event tagging process may also set one or more privacy settings on the photo album for the newly created event, such as limiting access to the photo album to the first-degree contacts of the users whose photos have been included in the photo album. In other implementations, the users' respective privacy settings for photographs or other media may be individually applied to each of the photos in the album. In some implementations, the users may also be prompted to specify privacy settings for such uploaded media.

For example, assume for didactic purposes that three first-degree friends attend a baseball game at Wrigley Field on Jul. 4, 2010. During the baseball game, each of them captures one or more pictures with a mobile phone and uses the media-uploading tool described above to upload photos from the mobile phone to the social networking system. There are maybe hundreds of other people at Wrigley Field also uploading photos to the social networking system during the baseball game. With the example method illustrated by FIG. 2, the event tagging process can, after one of the three first-degree friends confirms, create a photo album "Wrigley Field, Jul. 4, 2010" unique to the three first-degree friends, and automatically upload photos taken by all the three first-degree friends during the baseball game to the photo album. In particular implementations, the event tagging process may also automatically create an event in event database 102 that includes the three first-degree friends and a suggested title (such as "Bill, Ted & Jim at Wrigley Field, Jul. 4, 2010") that can be configurable by the contacts. The photo album can be associated with the event. From an events page, each of the three-first degree friends may invite additional users to join the event. Still further, the event tagging process may also cross-reference this newly-created event if it encounters photos from other users at the same location at the same time that are within a threshold degree of separation of users associated with the event and, possibly, suggest they join the event or ask the existing users in the event if the additional uses should join.

In other implementations, a second or alternative event can be automatically created that includes all photos from all users where metadata associated with the uploads suggest that all are within a threshold spatio-temporal proximity of each other. For example, a Wrigley Field event for Jul. 4, 2010 can be created for all users that have uploaded photos while attending a baseball game at that venue. In such an embodiment, the host of the event could be a business entity (such as the Chicago Cubs) that could maintain and curate a large photo album of the event in connection with a fan or profile page. In particular implementations, event organizers (such as a baseball team) could configure an event in events database including meta information about the event (location, date, time) and suggested tags. In the example provided above, the event tagging process could in connection with identifying tags and/or creating an event for the three first-degree friends may access the event database 102 and identify one or more tags to suggest to the users. The event tagging process may also prompt the users to be added to this event and/or to create a separate event that is related to the event created by the event organizer.

In particular embodiments, for each of the subset of users, the event tagging process may store information of the first event tag in a local storage (e.g., a MicroSD memory card) of the each user's mobile device. In some embodiments, the information of an locally stored event tag may comprise an expiration time (e.g., six hours from the creation of the event tag). For example, if a user of the subset of users accesses the media uploading tool to select one or more image files to upload to the social networking system, the media uploading tool may access one or more locally stored event tag(s) and present the one or more locally stored event tags to the user. If the user confirms a particular locally stored event tag, the media uploading tool may tag the particular locally stored event tag to the selected one or more image files. In other embodiments, if the user accesses the media uploading tool before a particular locally stored event tag expires, the media uploading tool may automatically tag the particular locally stored event tag to the selected one or more image files for the uploading request.

In addition to determining a first event tag based on a common location and a temporal overlap instance between the subset of users, the event tagging process may determine a first event tag based on an existing concurrent event that one or more of the plurality of requesting users have registered to. In particular embodiments, after receiving from each of the plurality of requesting users a user identifier of the social networking system, a current location and an indication of one or more available image files (201), the event tagging process may access an event database 102 and retrieve an existing event that a particular user of the plurality of users have registered with (or checked-in to) at or near the location and time stamp data of the uploading requests. In other implementations, the search for existing events may extend to events that contacts (first-degree, second-degree, etc.) have created, registered for or checked-in to. In particular embodiments, the event tagging process may suggest the existing event to the particular user, and in response to a confirmation from the particular user, create a first event tag based on the existing event and tag the first event tag to the one or more available images files from the particular user. The event tagging process may also access information about the existing event to suggest additional tags, such as attendees, locations, and other meta information. Furthermore, in particular embodiments, the event tagging process may identify a subset of users who are within a pre-determined social proximity to the particular user, and are within a pre-determined spatio-temporal proximity to the existing event. In particular embodiments, the event tagging process may associate the first event tag to the one or more available image files from each of the subset of users. In particular embodiments, the event tagging process may store or cause the media uploading tool described before to store the tagged one or more available image files in a data store (e.g., in media database 105). In some embodiments, the event tagging process may adjust the attendee list of the existing event to include one or more users of the subset of users.

Furthermore, the event tagging process may suggest an event tag confirmed by at least one of the plurality of users to one or more other users of the plurality of users wherein the one or more other users are in geo-temporal proximity to the event tag (e.g., within a quarter mile radius and within a time window of +/−30 minutes). That is, the event tagging process may suggest, to one or more of a plurality of users, an event tag based on social and spatio-temporal proximity between a subset of users (as illustrated by the example method of FIG. 2), or an event tag just created (by the example method of FIG. 2) in the geo-temporal vicinity, or an event tag based on an concurrent existing event.

In particular embodiments, the event tagging process may create a shared space, as discussed above, comprising one or more image or other multimedia files associated with an event and/or set of event-related tags. For example, a shared space of a particular event can include image files tagged with the particular event tag and uploaded to media database 105 by the example method of FIG. 2, or other image files or content objects tagged with the particular event tag and uploaded to media database 105 at a later time. The shared space can be connected or otherwise associated with an event page, a fan page and/or a user profile page. In particular embodiments, each image files or content object of a shared space may have individual privacy settings (e.g., accessible to all, accessible only to first-degree contacts, etc.). For example, when a first user of the social networking system requests a structured document (e.g., a web page) for a share space, the social networking system may access media database 105 and compose the structured document comprising image files and content objects accessible only to the first user, such as media files uploaded by first-degree friends of the first user. In other implementations, the shared space, as discussed above, may be associated with an event organizer where the uploaded media files may be publicly accessible to all users. In other implementations, access can be limited to the users associated with the event, first-degree contacts of such users, first- and second-degree contacts of such users, first-, second-, and third-degree contacts of such users, or all users of the social networking system.

Figure 2A:
FIGS. 2A-2C illustrate an example graphical user interface (GUI) of a client application hosted by a mobile phone for the example method of FIG. 2.
Figure 2B:
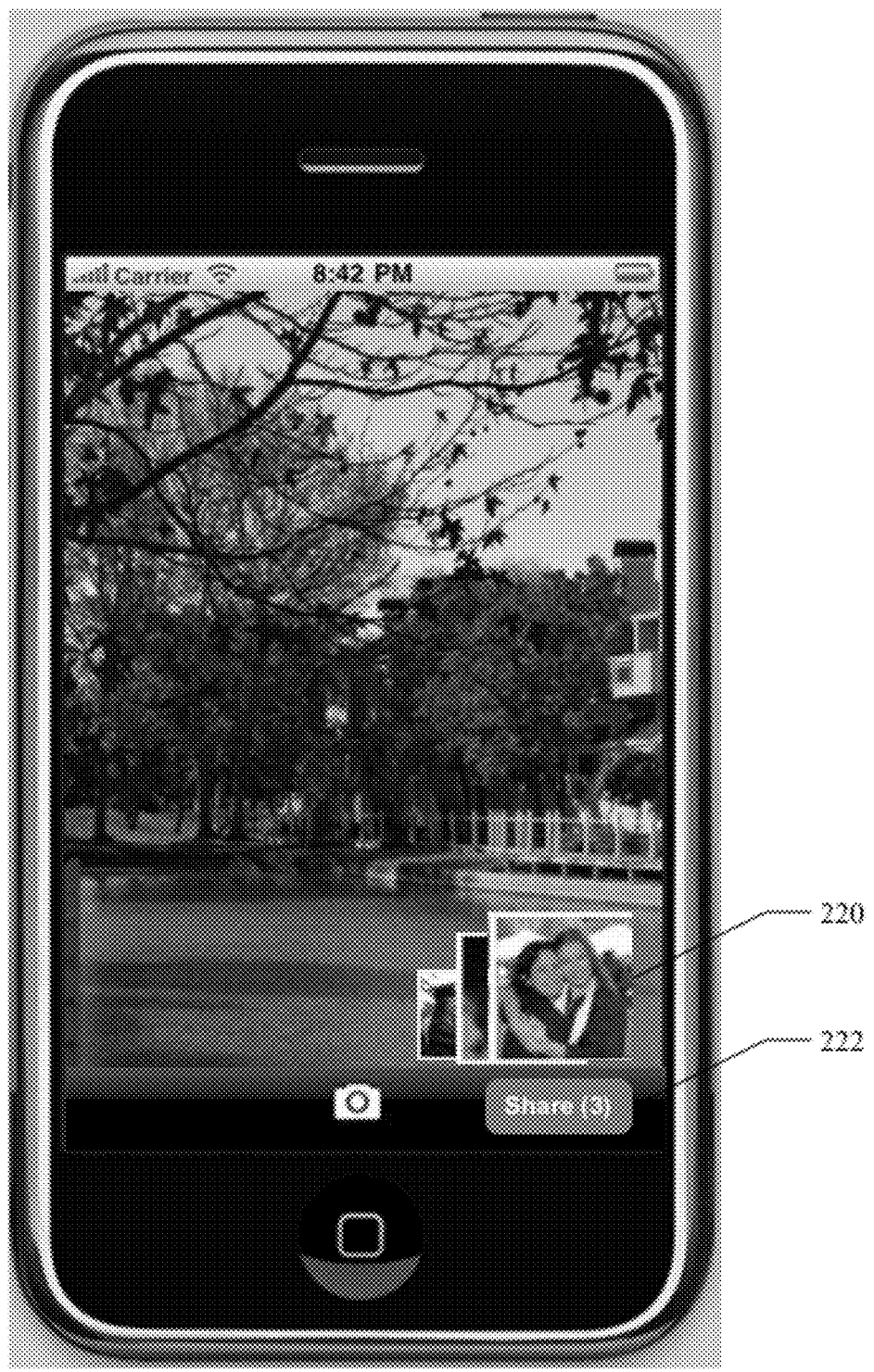
Figure 2C:

FIGS. 2A-2C illustrate an example graphical user interface (GUI) of a client application hosted by a mobile phone for the example method of FIG. 2. For example, a user can select one or more photos from the GUI (as indicated by the check marks illustrated in FIG. 2A). For example, the user can instruct the client application to upload the selected photos to a share space by selecting a "Share" button (210). The user may upload the selected photos to a shared space at a later time. In the example 2B, one or more thumbnails for the selected photos (220) overlays a camera viewfinder screen, and the user can instruct the client application to upload the selected photos by selecting a "Share (3)" button (222). FIG. 2C illustrates an example GUI presented to the user after the user instructed the client application to upload the selected photos. For example, the client application can present to the user an event tag proposed by the event tagging process in the GUI (234). The user can type a text string in the GUI (230) to name an event tag for the selected photos (e.g., "Amy's graduation"), or the user can select a "Share" button (232) and client application can tag the selected photos with the event tag proposed by the event tagging process ("Dartmouth College, Jun. 15, 2010") and upload the selected photos to media database 105.

Figure 2D:
FIG. 2D illustrates example structured documents of share spaces.

FIG. 2D illustrate an example structured document of shared spaces. In the example of FIG. 2D, a user can type in a search text string (e.g., "college" 240) in a graphical user interface (GUI) of a client application hosted by the user's mobile phone. The client application can transmit the search request to the social networking system, the social networking system can access media database 105 for one or more shared spaces with event tags matching (or partially matching) the search text string wherein the one or more shared spaces are accessible to the user. The social networking systems can transmit one or more content objects (or their thumbnails and associated URL links) accessible to the user and other related information of the one or more shared spaces to the client application. The client application can construct structured documents with the one or more content objects in the client application's GUI, as illustrated by photo reels 242 ("Dartmouth College, Jun. 15, 2010") and 244 ("College Concert, Summer '09") in FIG. 2D. Additionally, the client application can include additional information, e.g., number of the user's first-degree contacts who are tagged in a shared space, in the structured documents (246).

Figure 3:
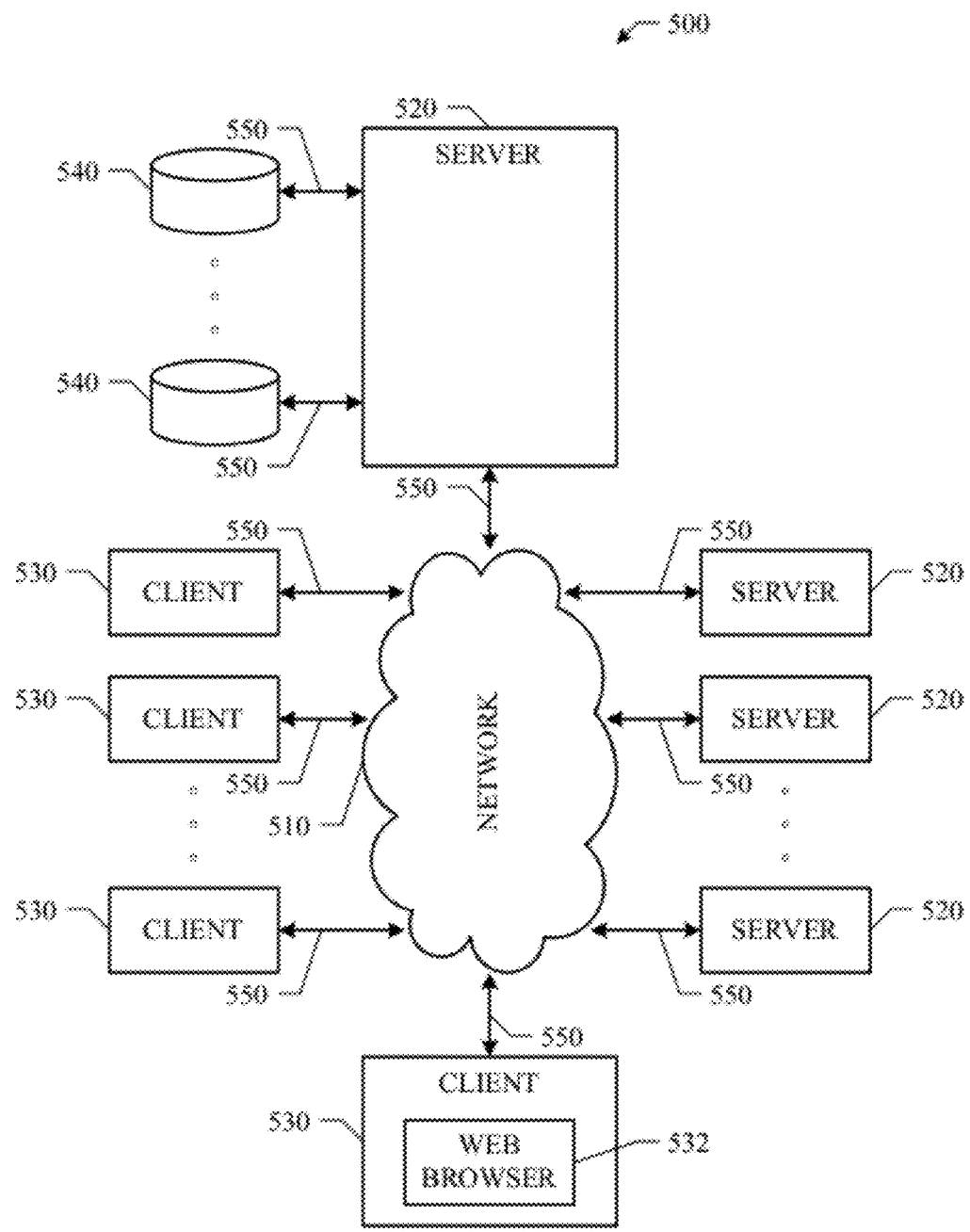
FIG. 3 illustrates an example network environment.

While the foregoing embodiments may be implemented in a variety of network configurations, the following illustrates an example network environment for didactic, and not limiting, purposes. FIG. 3 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more data storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510. One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

Figure 4:
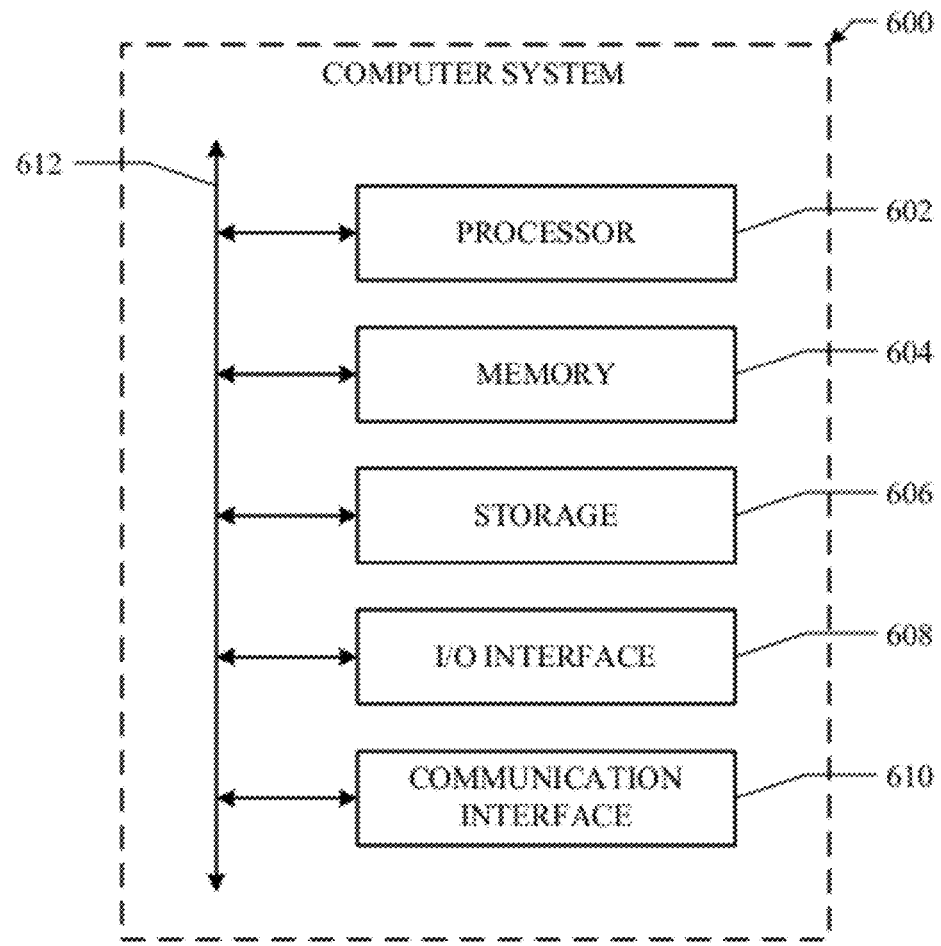
FIG. 4 illustrates an example computer system.

FIG. 4 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network (such as, for example, a 802.11a/b/g/n WI-FI network, a 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, a Long Term Evolution (LTE) network), or other suitable wireless network or a combination of two or more of these.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Degital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, a Advanced Microcontroller Bus Architecture (AMBA) bus, or another suitable bus or a combination of two or more of these. Bus 612 may include one or more buses 612, where appropriate.

Figure 5:
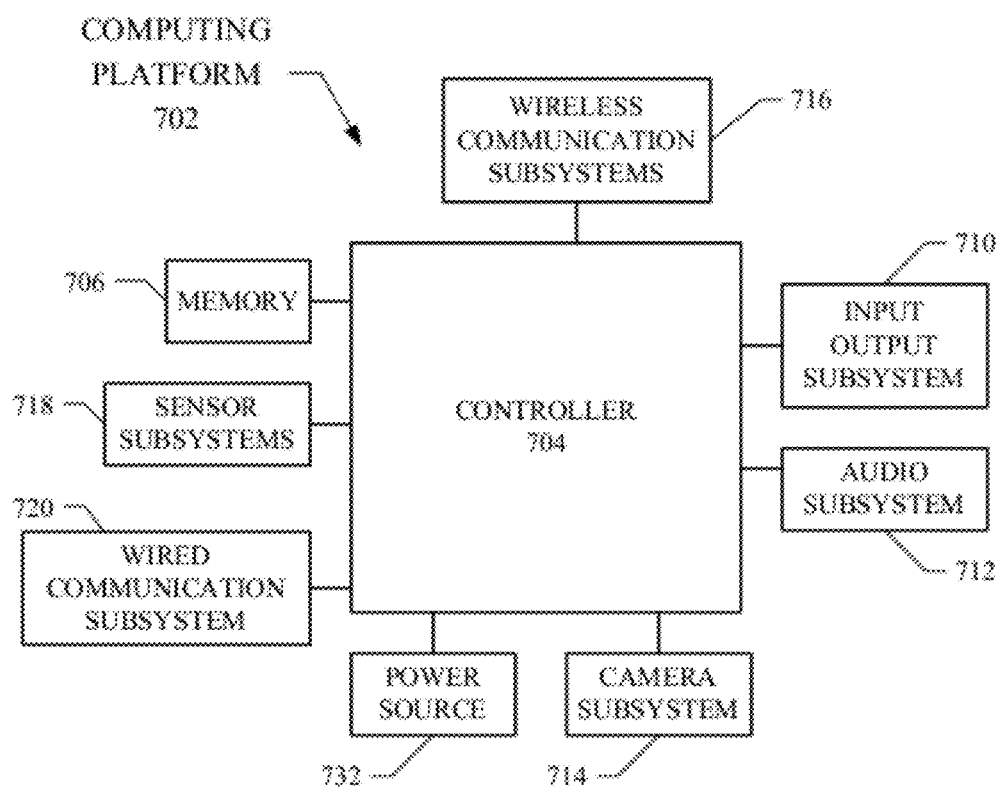
FIG. 5 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 5 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be WINDOWS-based, MAC-based, or UNIX or LINUX-based, or SYMBIAN-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 716 may include hosting protocols such that computing platform 702 may be configured as a base station for other wireless devices. Other input/output devices may include an accelerometer that can be used to detect the orientation of the device.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader).

In particular embodiments, various components of computing platform 702 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANS- PORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these. Additionally, computing platform 702 may be powered by power source 732.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   by the one or more server computing devices, receiving, from a client computing device of each of a plurality of users, a current location of the user and an indication of one or more media objects for uploading;
   by the one or more server computing devices, determining a first event based on social and spatio-temporal proximity among a subset of the users, the first event determined based on a current event for which one or more of the subset of users have registered, the spatio-temporal proximity being based at least in part on the current locations of the subset of the users;
   by the one or more server computing devices, creating a first event tag based on the determined first event;
   by the one or more server computing devices, sending the first event tag to the client computing device of at least one of the subset of the users that have not registered for the current event and is within spatio-temporal proximity to the one or more of the subset of users that have registered for the current event, receipt of the first event tag by the client computing device causing the client computing device to present the first event tag to the at least one of the subset of the users for confirmation; and
   by the one or more server computing devices, in response to one or more confirmations received from one or more of the client computing devices of one or more of the users in the subset of the users, associating the first event tag to the media objects, wherein the one or more confirmations are received from one or more humans.

2. The method of 1 further comprising:
   by the one or more server computing devices, storing the media objects in a data store.

3. The method of 1 wherein the determining a first event is further based on spatio or temporal proximity to one or more sponsorships.

4. The method of 1 wherein the subset of the users is further limited to users who are first-degree connections to each other.

5. The method of 1 wherein the subset of the users is further limited to users who are no more than a threshold number of degrees of separation from each other in a social graph, wherein the threshold number of degrees of separation between any two users is defined as the minimum number of hops required to traverse the social graph from one user to another user.

6. The method of 1 wherein the subset of the users is further limited to users who are associated with current location data within a pre-determined distance from each other.

7. The method of 1 wherein each of the subset of the users is further limited to users who are within a threshold degree of geo-temporal proximity to each other.

8. One or more computer-readable non-transitory storage media embodying software that is operable when executed to:
   receive, from a client computing device of each of a plurality of users, a current location of the user and an indication of one or more media objects for uploading;
   determine a first event based on social and spatio-temporal proximity among a subset of the of users, the first event determined based on a current event for which one or more of the subset of users have registered, the spatio-temporal proximity being based on at least in part on the current location of the subset of the users;
   create a first event tag based on the determined first event;
   send the first event tag to the client computing device of at least one of the subset of the users that have not registered for the current event but is within spatio-temporal proximity to the one or more of the subset of users that have registered for the current event, receipt of the first event tag by the client computing device causing the client computing device to present the first event tag to the at least one of the subset of the users for confirmation; and
   in response to one or more confirmations received from one or more of the client computing devices of one or more of the users in the subset of the users, associate the first event tag to the media objects, wherein the one or more confirmations are received from one or more humans.

9. The media of 8, wherein the software is further operable when executed to:
   store the media objects in a data store.

10. The media of 8 wherein the determining a first event is further based on spatio or temporal proximity to one or more sponsorships.

11. The media of 8 wherein the subset of the users is further limited to users who are first-degree connections to each other.

12. The media of 8 wherein the subset of the users is further limited to users who are no more than a threshold number of degrees of separation from each other in a social graph wherein the threshold number of degrees of separation between any two users is defined as the minimum number of hops required to traverse the social graph from one user to another user.

13. The media of 8 wherein the subset of the users is further limited to users who are associated with current location data within a pre-determined distance from each other.

14. The media of 8 wherein each of the subset of the users is further limited to users who are within a threshold degree of geo-temporal proximity to each other.

15. A system comprising:
   one or more processors; and
   a memory coupled to the processors comprising instructions executable by the processors, the processors being operable when executing the instructions to:

receive, from a client computing device of each of a plurality of users, a current location of the user and an indication of one or more media objects for uploading;

determining a first event based on social and spatio-temporal proximity among a subset of the of users, the first event determined based on a current event for which one or more of the subset of users have registered, the spatio-temporal proximity being based on at least in part on the current location of the subset of the users;

create a first event tag based on the determined first event;

send the first event tag to the client computing device of at least one of the subset of the users that have not registered for the current event but is within spatio-temporal proximity to the one or more of the subset of users that have registered for the current event, receipt of the first event tag by the client computing device causing the client computing device to present the first event tag to the at least one of the subset of the users for confirmation; and in response to one or more confirmations received from one or more of the client computing devices of one or more of the users in the subset of the users, associate the first event tag to the media objects, wherein the one or more confirmations are received from one or more humans.

16. The system of 15, wherein the processors are further operable when executing the instructions to:

store the media objects in a data store.

17. The system of 15 wherein the determining a first event is further based on spatio or temporal proximity to one or more sponsorships.

* * * * *